US007002456B2

(12) United States Patent
Lin

(10) Patent No.: US 7,002,456 B2
(45) Date of Patent: Feb. 21, 2006

(54) RECEIVER CIRCUIT AND METHOD FOR TIRE PRESSURE MONITORING SYSTEM

(75) Inventor: Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 141 days.

(21) Appl. No.: 10/341,261

(22) Filed: Jan. 13, 2003

(65) Prior Publication Data

US 2004/0135682 A1     Jul. 15, 2004

(51) Int. Cl.
*B60C 23/00*     (2006.01)
(52) U.S. Cl. .................. 340/447; 340/442; 455/130
(58) Field of Classification Search ............... 340/447, 340/442, 443, 539.1, 539.3; 455/130, 574, 455/234.2, 343.1, 343.2, 227
See application file for complete search history.

(56) References Cited

U.S. PATENT DOCUMENTS

| | | | |
|---|---|---|---|
| 4,319,220 A | 3/1982 | Pappas et al. ............... 340/58 |
| 4,695,823 A | 9/1987 | Vernon ....................... 340/58 |
| 5,274,355 A | 12/1993 | Galan ......................... 340/445 |
| 5,585,554 A | 12/1996 | Handfield et al. .......... 73/146.5 |
| 5,853,020 A | 12/1998 | Widner ....................... 137/227 |
| 5,950,120 A * | 9/1999 | Gardner et al. ........... 455/343.1 |
| 5,987,980 A | 11/1999 | Mangafas et al. .......... 73/146.8 |
| 6,016,102 A | 1/2000 | Fortune et al. ............. 340/442 |
| 6,021,022 A | 2/2000 | Himes et al. ............... 360/104 |
| 6,161,905 A | 12/2000 | Hac et al. ................... 303/146 |
| 6,309,223 B1 | 10/2001 | Wolfe ......................... 439/67 |
| 6,360,594 B1 | 3/2002 | Koch et al. ................. 73/146.5 |
| 6,369,703 B1 | 4/2002 | Lill ............................ 340/447 |
| 6,371,178 B1 | 4/2002 | Wilson ....................... 152/152.1 |
| 6,393,066 B1 * | 5/2002 | Moretti et al. ............. 375/295 |
| 6,481,806 B1 | 11/2002 | Krueger et al. ............ 303/140 |
| 6,728,234 B1 * | 4/2004 | Hofmann et al. .......... 370/350 |
| 6,744,357 B1 * | 6/2004 | Itou et al. .................. 340/445 |
| 6,759,952 B1 * | 7/2004 | Dunbridge et al. ........ 340/444 |
| 6,801,148 B1 * | 10/2004 | Freeman et al. ........... 341/143 |
| 2002/0049581 A1 * | 4/2002 | Liu ............................ 704/200 |
| 2004/0078662 A1 * | 4/2004 | Hamel et al. ............... 714/22 |
| 2004/0087297 A1 * | 5/2004 | Ash ............................ 455/290 |

OTHER PUBLICATIONS

RIN 2127-A133F Federal Motor Vehicle Safety Standards: Tire Pressure Monitoring Systems; Controls and Displays; Department of Transportation, National Highway Traffic Safety Administration, 49 CFR Part 571, (www.nhtsa.dot-.gov/cars/rules/rulings/TirePressure/fedreg.htm), 45 pages.

* cited by examiner

*Primary Examiner*—Phung T. Nguyen
(74) *Attorney, Agent, or Firm*—Jimmy L. Funke

(57) ABSTRACT

Circuit system and method for receiving and demodulating signals to a tire pressure monitoring system. The circuit comprises a demodulator for receiving an input signal modulated at a first frequency and demodulating the input signal so that information can be extracted from the input signal at a second frequency lower than the first frequency. The circuit further comprises a microprocessor, operating at a clock rate selected to extract information from the demodulated signal at the second frequency, for receiving and decoding a demodulated signal from the demodulator. In another aspect, the demodulator comprises a switching circuit having a time constant longer than the period of the first frequency. The switching circuit provides a low signal when the demodulator receives an input signal in a first state, remains low after the amplified signal changes to a second state for a time constant period, and provides a high signal when the amplified signal is in the second state after the time constant period has elapsed.

28 Claims, 2 Drawing Sheets

RECEIVER CIRCUIT AND METHOD FOR TIRE PRESSURE MONITORING SYSTEM

BACKGROUND OF THE INVENTION

The present invention is generally related to tire pressure monitoring systems, and, more particularly, to a receiver for receiving information from an external source relative to a tire pressure monitoring system.

Tire pressure monitoring systems (TPMS), such as may be prescribed by governmental regulations, are becoming prevalent in automotive applications. See, for example, 49 CFR Part 571, Titled "Federal Motor Vehicle Safety Standards: Tire Pressure Monitoring Systems; Controls and Displays", regarding governmental regulations in the U.S. One basic configuration of a TPMS generally includes various components, such as a pressure sensor, a transmitter and a microprocessor that may be assembled within the interior of the tire. Most TPMSs are self-powered by a battery.

To reduce system costs and power consumption, the TPMS may not include a receiver. However, communications from an external source into the TPMS may be problematic since the TPMS transmitter is not generally designed to receive signals, but is designed just to transmit them. Communications from an external source or device may be useful for supplying various types of information to the TPMS, such as training the system to know wheel sensor location in the vehicle, e.g., Front right, Front left, Rear right, Rear left, spare tire location, or performing calibration of the pressure sensing device, if optionally desired, etc. However, the addition of receiving capabilities to the TPMS requires additional circuit complexity and increased power requirements.

While receiver circuits have been proposed for use in TPMS applications, the proposed circuits have relatively high power requirements compared to TPMS applications not using a receiver. In addition, proposed TPMS receiver circuits require running the microprocessor at a relatively fast clock rate, such as corresponding to the frequency of the externally derived signal, and, consequently, exhibit a relatively high power consumption rate. It will be appreciated that because of the location of the TPMS, i.e., within a tire, it is desired to minimize power consumption so that users are not burdened with frequent TPMS maintenance, such as battery replacement.

In view of the foregoing issues, it would be desirable to provide a reliable, low power, and low-cost TPMS receiver that allows communicating information, for example, to the microprocessor of the TPMS, for performing various operational functions, such as testing, calibration (if optionally desired), TPMS training, etc.

BRIEF SUMMARY OF THE INVENTION

Generally, the present invention fulfills the foregoing needs by providing, in one aspect, a tire pressure monitoring system for receiving an externally derived signal modulated at a first frequency. The system includes an input stage for receiving the externally derived signal and providing an amplified signal. The system also includes a demodulator for receiving an amplified signal from the input stage and demodulating the amplified signal so that information can be extracted from the amplified signal at a second frequency lower than the first frequency. The system further includes a microprocessor for receiving and decoding a demodulated signal from the demodulator. In an embodiment, the microprocessor operates at a clock rate selected to extract information from the demodulated signal at the second frequency.

The present invention further fulfils the foregoing needs by providing, in another aspect thereof, a circuit for demodulating an input signal modulated at a first frequency. The circuit includes a demodulator for receiving and demodulating the input signal so that information can be extracted from the input signal at a second frequency lower than the first frequency. The circuit also includes a microprocessor for receiving and decoding a demodulated signal from the demodulator. The microprocessor operates at a clock rate selected to extract information from the demodulated signal at the second frequency.

In yet another aspect of the invention, a method for demodulating an input signal modulated at a first frequency is provided. The method includes receiving and demodulating the input signal so that information can be extracted from the input signal at a second frequency lower than the first frequency. The method also includes receiving and processing a demodulated signal from the demodulator at a clock rate selected to extract information from the demodulated signal at the second frequency.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
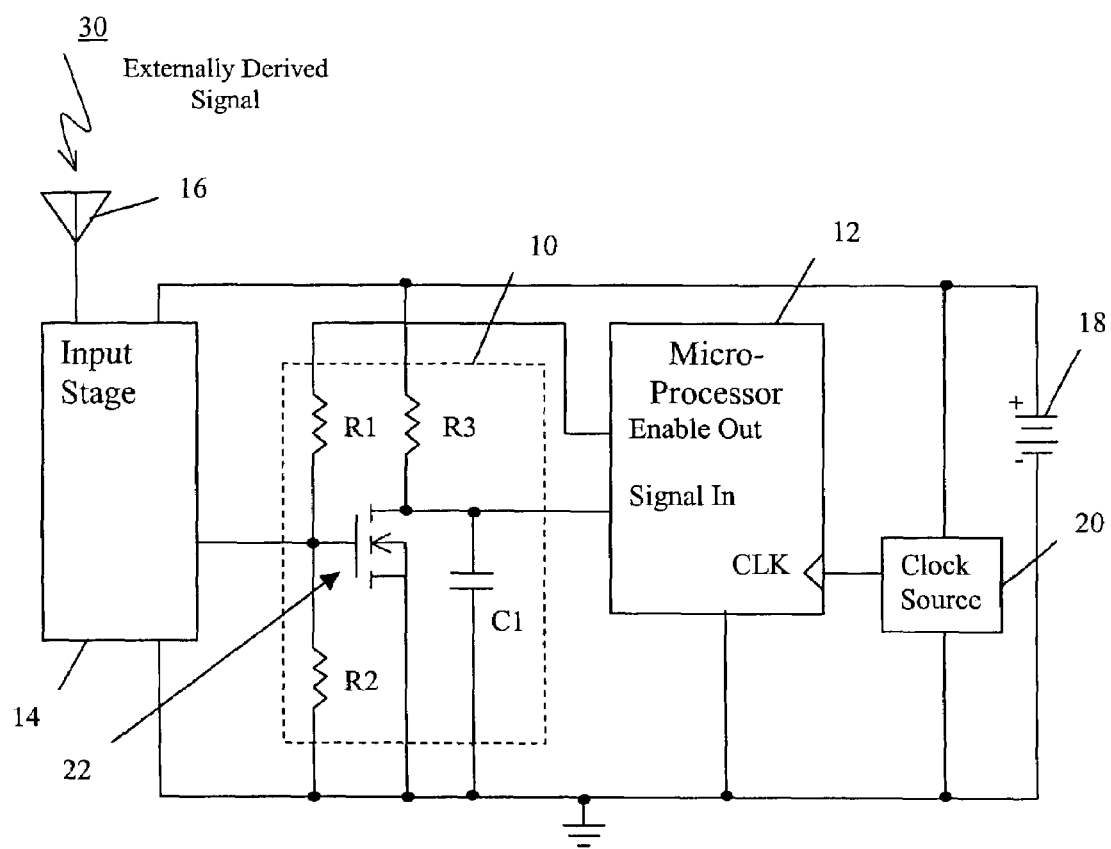
FIG. 1 illustrates a schematic of a circuit embodying aspects of the present invention that allows receiving and demodulating signals from an external device relative to a tire pressure monitoring system.

FIG. 1 illustrates a schematic of a circuit embodying aspects of the present invention that allows receiving and demodulating signals from an external device relative to a tire pressure monitoring system (TPMS), such as may be used in mobile assets having pneumatically inflatable tires. Examples of mobile assets may include cars, trucks, airplanes, industrial equipment, etc. In an embodiment, the present invention provides a low cost, low component count, low power consumption system that allows receiving externally derived signals 30 from an external source, such as a training device, a calibrating device, a testing device, etc., to the TPMS. The TPMS may include a microprocessor 12 to control the functions of the TPMS, such as tire pressure sensing, transmitting, and receiving. In addition, the microprocessor 12 may perform power control for devices associated with the TPMS and operate in respective "sleep" modes to conserve power. The TPMS may further include a power source, such as a battery 18, an input stage 14, and a demodulator 10. The above described exemplary TPMS components may be mounted and connected on a printed circuit board (PCB) sized and configured to mount within a pneumatically inflatable tire. The PCB may be made up of a relatively flat and hard board, which may include at one side thereof solder pads for connections for a variety of electronic components, such as microprocessor 12, input stage 14, demodulator 10, clock source 20, and battery 18. Each side of the PCB, or layers within the PCB, may be configured with electrically conductive pathways between the components.

The inventor of the present invention has innovatively recognized that by adding a switch-based, demodulator 10 to the receiver circuit, a low cost, low power receiver having a low component count can be provided. Accordingly, aspects of the invention will now be described in detail with respect to demodulator 10, the associated circuitry, and the propagation of signals through the circuit.

Figure 2:
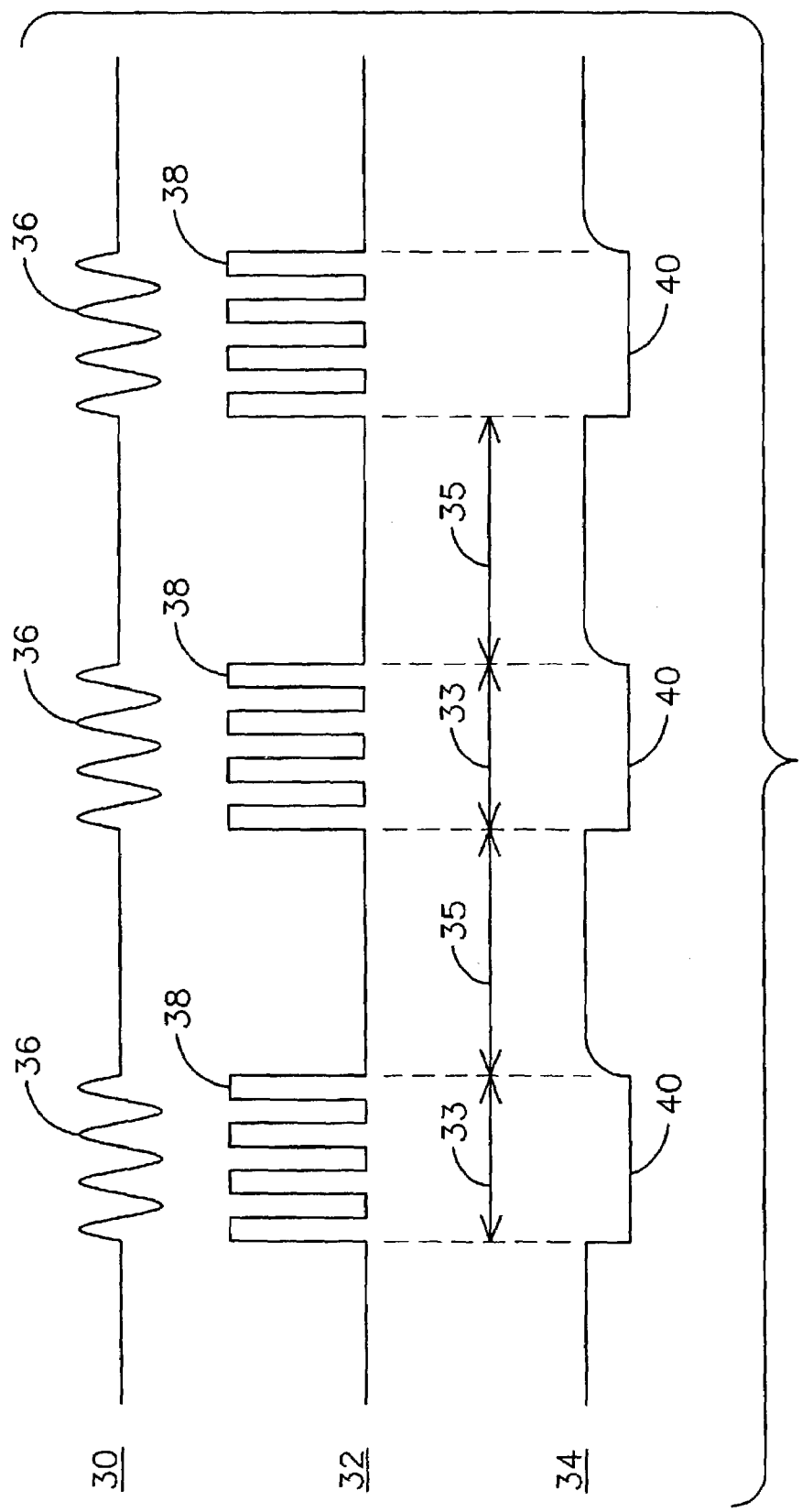
FIG. 2 is an exemplary diagram illustrating exemplary signals that may propagate through the circuit of FIG. 1.

FIG. 2 is an exemplary diagram illustrating exemplary signals through each stage of the circuit. In one aspect of the invention, input stage 14 receives an externally derived signal 30, such as a training signal, a calibrating signal, or a testing signal, and provides an amplified signal based on the received signal. For example, the externally derived signal 30 may comprise a series of pulses 36 appropriately modulated for encoding information, e.g., using standard frequency modulation techniques. The input stage 14 for receiving externally derived signal 30 may include a resonant tank circuit, comprising an inductor and capacitor, in parallel circuit, and coupled to an antenna 16. The values of the inductor and capacitor may be chosen so that the tank circuit resonates at a specific frequency and develops a desired response in the presence of frequency modulated pulses 36 modulated at the specific frequency. For example, the modulation frequency may be chosen so that the communication system is usable without regulatory approval, such as at a frequency range of approximately 125 KHz.

In addition to the tank circuit, input stage 14 may include an amplifier to amplify the output response of the tank circuit. In typical TPMS applications, the voltage output of the tank circuit is very low, for example, on the order of milli-volts (mV), due to antenna 16 size constraints. Consequently, an amplifier is provided to boost the output response of the tank circuit to a usable level. In one aspect of the invention, a comparator, coupled to the tank circuit, is used to amplify and convert the received externally derived signal 30 into a corresponding amplified signal 32 comprising a stream of pulses, or amplified signal pulses 38. In another aspect of the invention, amplified signal pulses 38 may have an amplitude corresponding to the voltage level, measured from a common reference, used to power the comparator, e.g., rail-to-rail voltage amplitude. For example, the common reference may be 0 volts, and the voltage level measured from the common reference may be 3.3 volts. Accordingly, rail-to-rail pulses 38 would have a discrete high level amplitude voltage of 3.3 volts measured from 0 volts, and a discrete low level voltage of 0 volts. The amplified signal 32, comprising blocks of amplified signal pulses 38 output from the comparator, can be AC coupled using a decoupling capacitor to eliminate any DC offset before providing amplified signal 32 to demodulator 10.

In another aspect of the invention, the output of input stage 14 is coupled to the input of demodulator 10. After the externally derived signal 30 is received and amplified in input stage 14, the amplified signal 32 is passed to demodulator 10 to convert the amplified signal pulses 38 to a lower frequency, so that information can be extracted from the amplified signal 32 at a lower frequency than the modulation frequency of the externally derived signal 30. In an embodiment of the invention, demodulator 10 is a switching circuit configured to have a time constant sufficiently long relative to the modulation frequency of the externally derived signal 30, so that the switching circuit remains in the same state when receiving an amplified signal 32 at the corresponding modulation frequency. For example, the time constant may be longer than half the period of the modulation frequency of the externally derived signal 30. Accordingly, the switching circuit provides a first output condition, such as a discrete low voltage level, when demodulator 10 receives a block of amplified signal pulses 38 from input stage 14. This first output condition is represented in FIG. 2 by twin-headed arrow 33. The switching circuit remains in first output condition for a time constant period corresponding to each inter-pulse period of the amplified signal pulses 38 when the amplified signal pulses 38 are low. If no amplified signal pulses 38 are provided to the switching circuit from input stage 14 after the time constant period has elapsed, the switching circuit provides a second output condition, such as a discrete high voltage level, represented by twin-headed arrow 35, until another block of amplified signal pulses 38 are received. As a result, in one aspect of the invention, the switching circuit output remains low when a block of amplified signal pulses 38 are received, and provides a high output when no block of amplified signal pulses 38 is being received. As will be now recognized by those skilled in the art, the foregoing demodulation technique essentially allows down-converting in frequency while ensuring that the integrity of information content is maintained. As suggested above, the down-converting of frequency is desirable since, as discussed in greater detail below, this allows microprocessor 12 to operate at a lower frequency than otherwise would be the case, which results in power savings in the operation of the TPMS. Even though the magnitude of the power savings may be relatively small over a small period of time, cumulatively over a period of years the power savings will add up and is expected to advantageously increase the life of the battery of the TPMS and consequently increase the length of maintenance intervals for the TPMS.

In an embodiment of the invention, the switching circuit can include a transistor, such as a bipolar transistor, and a resistor/capacitor (RC) circuit coupled to the transistor output to provide a desired time constant for the switching circuit. The values of the resistor and capacitor can be selected to ensure that the output of the transistor decays at a rate corresponding to the time constant when the transistor is turned off.

In yet another embodiment of the invention, demodulator 10 includes a field effect transistor (FET) 22 to perform the above described switching function. As shown in FIG. 1, FET 22 can be biased by resistors R1 and R2 so that FET 22 gate voltage is maintained at a bias voltage level near, but slightly lower than, FET 22 turn on voltage. The amplified signal 32, including blocks of amplified signal pulses 38, output from input stage 14 is coupled to the biased gate of the FET 22. When blocks of amplified signal pulses 38 are not present at FET 22 gate, FET 22 will not conduct current, or is turned off. Conversely, when a block of amplified signal pulses 38 having an pulse amplitude greater than the difference between the bias voltage of FET 22 and FET 22 turn on voltage is present at FET 22 gate, FET 22 conducts current, or is turned on. In an aspect of the invention, the source of FET 22 is coupled to a signal input of microprocessor 12 to provide demodulated information to microprocessor 12 according to the conditions when FET 22 is on or off.

To provide demodulation capability, a resistor (R3)/capacitor (C1), or RC, circuit is also coupled to the source of FET 22 to provide a demodulated output having a desired time constant. By coupling the RC circuit to the source of FET 22, the effect of switching FET 22 from on to off is delayed for a time constant period, determined by the time constant provided by the RC circuit. For example, assuming the modulation frequency of the externally derived signal 30 is 125 kHz with a period of 8 microseconds, the resulting amplified signal pulses 38 would have an 8 microsecond period and a 50% duty cycle. At the 50% duty cycle, the amplified signal pulses 38 would be high for 4 microseconds, and low for 4 microseconds. In this example, a time constant period of greater than 4 microseconds, or half the modulation period, may be selected to ensure that the effect of switching FET 22 from on to off is delayed until the next amplified signal pulse 38 is received.

When no block of amplified signal pulses 38 is present at the gate of FET 22, the FET 22 is off and capacitor C1 is charged by the battery 18 through resistor R3. As a result, the demodulated output provided to microprocessor 12 is a discrete high voltage level, for example, battery 18 voltage. When a block of amplified signal pulses 38 is present at the gate of FET 22, FET 22 will be turned on and stay on for the time period when each received pulse in the block of amplified signal pulses 38 is high. When FET 22 is on, current in the RC circuit is conducted through FET 22, allowing capacitor C1 to discharge, causing the input signal to microprocessor 12 to go low. Conversely, when the pulses in the received block of amplified signal pulses 38 are low, FET 22 will turn off and stay off for the time period when the pulses are low. However, the RC circuit coupled to the source of FET 22 prevents the demodulated output signal from immediately changing state when FET 22 turns off, and, if the output is prevented from changing its state for a period exceeding the period of the amplified signal pulses 38, then the block of amplified signal pulses 38 is integrated into a continuous pulse 40 corresponding to the length of the block of amplified signal pulses 38. For example, the threshold voltage for the signal input of the microprocessor 12 may be 0.2 volts. Therefore, if the input to the microprocessor 12 is kept below 0.2 volts by the RC circuit during the intervals when the amplified signal pulses 38 are low, microprocessor 12 interprets the demodulated output signal 34 as low. Accordingly, resistor R3 and capacitor C1, forming the RC circuit coupled to the source of FET 22, are selected so that the time constant is much longer than the modulation frequency period of the externally derived signal 30 and the resulting pulse frequency period of the amplified signal pulses 38. The demodulated, continuous pulses 40 can then be provided to microprocessor 12 as a demodulated output signal 34 which changes state according to the amplified signal pulses 38 and the RC time constant.

In yet another aspect of the invention, the demodulated output signal 34 provided to the signal input of microprocessor 12 coupled to FET 22 source advantageously allows microprocessor 12 to extract information from the externally derived signal 30 at a slower clock speed. For example, a clock source 20 coupled to the clock input of microprocessor 12 can provide a lower frequency clock signal to allow microprocessor 12 to extract information. The demodulated signal 34 can be detected at a rate corresponding to the frequency of the demodulated signal 34, such as a Nyquist rate of at least twice the frequency of the demodulated signal 34. By operating at a lower clock rate, microprocessor 12 consumes less power and generates less heat, providing a longer battery 18 life. In an embodiment, the demodulated signal 34 can include information usable to perform TPMS operational functions such as testing, training, or calibration of the TPMS. The training information may include training the TPMS to recognize the corresponding tire's mounting position on a vehicle. Such information can be encoded in the externally derived signal 30 as a series of modulated pulses wherein the information is carried serially, such as by varying the width of the modulated pulses, or the intervals between the modulated pulses, or both.

In yet another power saving aspect of the invention, power may be supplied to input stage 14 and demodulator 10 when the system is receiving an externally derived signal and when the system is polling for the presence of an externally derived signal. For example, microprocessor 12 controls, through an enable out port, power supplied to the comparator in input stage 14 and biasing of FET 22 in demodulator 10. Consequently, power is not consumed when the system is not receiving an externally derived signal, except when the system is periodically powered up to poll for an externally derived signal 30.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A tire pressure monitoring system including a receiver disposed on a tire on a vehicle and powered by a stand alone power source not capable of being recharged during operation of the vehicle, the receiver using a frequency domain process for reducing power consumption while operating, the system comprising:
    an input stage for receiving an externally derived signal modulated at a first frequency and providing an amplified signal having a first state and a second state;
    a demodulator for receiving the amplified signal from the input stage and demodulating the amplified signal so that information can be extracted from the amplified signal at a second frequency lower than the first frequency; and
    a microprocessor for receiving and decoding a demodulated signal from the demodulator, wherein the microprocessor is configured to operate at a reduced clock rate compared to a clock rate if the microprocessor were to process a demodulated signal at the first frequency, the reduced clock rate selected to extract information from the demodulated signal at the second frequency, the second frequency being sufficiently lower relative to the first frequency so that an incremental power savings is achieved when operating the microprocessor at the selected clock rate.

2. The system of claim 1, wherein the demodulator comprises a switching circuit configured to provide a first output condition when the demodulator receives an amplified signal in the first state, the switching circuit having a time constant sufficiently long relative to a period corresponding to the first frequency so that the first output condition is maintained so long as the amplified signal transitions to the second state for a period of time not exceeding the time constant.

3. The system of claim 2, wherein the switching circuit is further configured to provide a second output condition when the amplified signal remains in the second state longer than the time constant.

4. The system of claim 3, wherein the switching circuit comprises a transistor and a resistor/capacitor (RC) circuit coupled to the transistor output, wherein the resistor and capacitor value are selected to provide the time constant.

5. The system of claim 4, wherein the transistor is a field effect transistor (FET).

6. The system of claim 1, wherein power is supplied to the demodulator when the system is receiving an externally derived signal and/or when the system is polling for the presence of an externally derived signal.

7. The system of claim 1, wherein the demodulated signal comprises a stream of demodulated pulses carrying information usable by the microprocessor to perform a respective operational function.

8. The system of claim 7, wherein the information is selected from the group consisting of test information, training information, and calibration information.

9. The system of claim 8, wherein the training information comprises location information corresponding to the mounting position of a tire on an automobile.

10. The system of claim 1, wherein the input stage comprises:
an impedance, tuned to a predetermined frequency, for receiving a signal modulated at the predetermined frequency and developing a desired response signal across the impedance; and
an amplifier for amplifying the response signal across the impedance.

11. The system of claim 10, wherein the amplifier is a comparator circuit for converting the received signal into a corresponding stream of amplified pulses.

12. The system of claim 11, wherein the amplified pulses comprise pulses having an amplitude corresponding to a voltage level for powering the system.

13. The system of claim 1, wherein power is supplied to the amplifier when the system is receiving an externally derived signal and/or when the system is polling for the presence of an externally derived signal.

14. The system of claim 1, wherein the first frequency comprises a frequency that is usable without regulatory approval.

15. The system of claim 14, wherein the first frequency corresponds to a frequency range of about 125 kHz.

16. A circuit disposed on a tire on a vehicle for demodulating an input signal to a tire pressure monitoring system, the circuit powered by a stand alone power source not capable of being recharged during operation of the vehicle and using a frequency domain process for reducing power consumption while operating, the circuit comprising:
a demodulator for receiving and demodulating the input signal so that information can be extracted from the input signal at a second frequency lower than the first frequency; and
a microprocessor for receiving and decoding a demodulated signal from the demodulator, wherein the microprocessor operates at a reduced clock rate compared to a clock rate if the microprocessor were to process a demodulated signal at the first frequency, the reduced clock rate selected to extract information from the demodulated signal at the second frequency.

17. The circuit of claim 16, wherein the demodulator comprises a switching circuit configured to provide a first output condition when the demodulator receives an amplified signal in the first state, the switching circuit having a time constant sufficiently long relative to a period corresponding to the first frequency so that the first output condition is maintained so long as the amplified signal transitions to the second state for a period of time not exceeding the time constant.

18. The circuit of claim 17, wherein the switching circuit is further configured to provide a second output condition when the amplified signal remains in the second state longer than the time constant.

19. The circuit of claim 18, wherein the switching circuit comprises a transistor and a resistor/capacitor (RC) circuit coupled to the transistor output, wherein the resistor and capacitor value are selected to provide the time constant.

20. The circuit of claim 19, wherein the transistor is a field effect transistor (FET).

21. The circuit of claim 15, wherein power is supplied to the demodulator when the system is receiving an externally derived signal and/or when the system is polling for the presence of an externally derived signal.

22. The circuit of claim 16, wherein the demodulated signal comprises a stream of demodulated pulses carrying information usable by the microprocessor to perform a respective operational function.

23. The circuit of claim 22, wherein the information is selected from the group consisting of test information, training information, and calibration information.

24. The circuit of claim 23, wherein the training information comprises location information corresponding to the mounting position of a tire on an automobile.

25. A method for demodulating an input signal having a first state and a second state, the input signal comprising information for a tire pressure monitoring system including a receiver disposed on a tire on a vehicle, the receiver powered by a stand alone power source not capable of being recharged during operation of the vehicle, the receiver using a frequency domain process for reducing power consumption while operating, the method comprising:
demodulating the input signal so that information can be extracted from the input signal at a second frequency lower than the first frequency; and
processing a demodulated signal with a microprocessor operating at a reduced clock rate compared to a clock rate if one were to process a demodulated signal at the first frequency, the reduced clock rate selected to extract information from the demodulated signal at the second frequency, the second frequency being sufficiently low relative to the first frequency so that an incremental power savings is achieved when operating the microprocessor at the selected clock rate.

26. A method for demodulating an input signal having a first state and a second state, the input signal comprising information for a tire pressure monitoring system, the method comprising:
demodulating the input signal so that information can be extracted from the input signal at a second frequency lower than the first frequency;
processing a demodulated signal with a microprocessor operating at a clock rate selected to extract information from the demodulated signal at the second frequency, the second frequency being sufficiently low relative to the first frequency so that an incremental power savings is achieved when operating the microprocessor at the selected clock rate, wherein the step of receiving and demodulating the input signal further comprises:
forward biasing a transistor to a voltage potential just below the transistor's turn on voltage;
coupling the transistor output to a resistor/capacitor (RC) circuit, wherein the resistor and capacitor values are selected to provide a time constant longer than the period of the first frequency;
turning on the transistor and providing a first output condition when receiving an input signal in the first state;
turning off the transistor when receiving an input signal changing to the second state and remaining in a first output condition for a time constant period corresponding to the time constant, and providing a second output condition when the input signal remains in the second state after the time constant period has elapsed.

27. A pneumatic tire comprising a tire pressure monitoring system including a receiver powered by a stand alone power source not capable of being recharged during operation of the vehicle, the receiver using a frequency domain process for reducing power consumption while operating, wherein the system comprises a demodulator for receiving and demodulating an input signal modulated at a first frequency so that information can be extracted from the input signal at a second frequency lower than the first frequency; and a microprocessor for receiving and decoding a demodulated signal from the demodulator, wherein the microprocessor operates at a reduced clock rate compared to a clock rate if the microprocessor were to process a demodulated signal at the first frequency, the reduced clock rate selected to extract information from the demodulated signal at the second frequency.

28. A vehicle comprising at least one inflatable tire with a tire pressure monitoring system including a receiver powered by a stand alone power source not capable of being recharged during operation of the vehicle, the receiver using a frequency domain process for reducing power consumption while operating, wherein the system comprises a demodulator for receiving and demodulating an input signal modulated at a first frequency so that information can be extracted from the input signal at a second frequency lower than the first frequency; and a microprocessor for receiving and decoding a demodulated signal from the demodulator, wherein the microprocessor operates at a reduced clock rate compared to a clock rate if the microprocessor were to process a demodulated signal at the first frequency, the reduced clock rate selected to extract information from the demodulated signal at the second frequency.

* * * * *